June 17, 1969

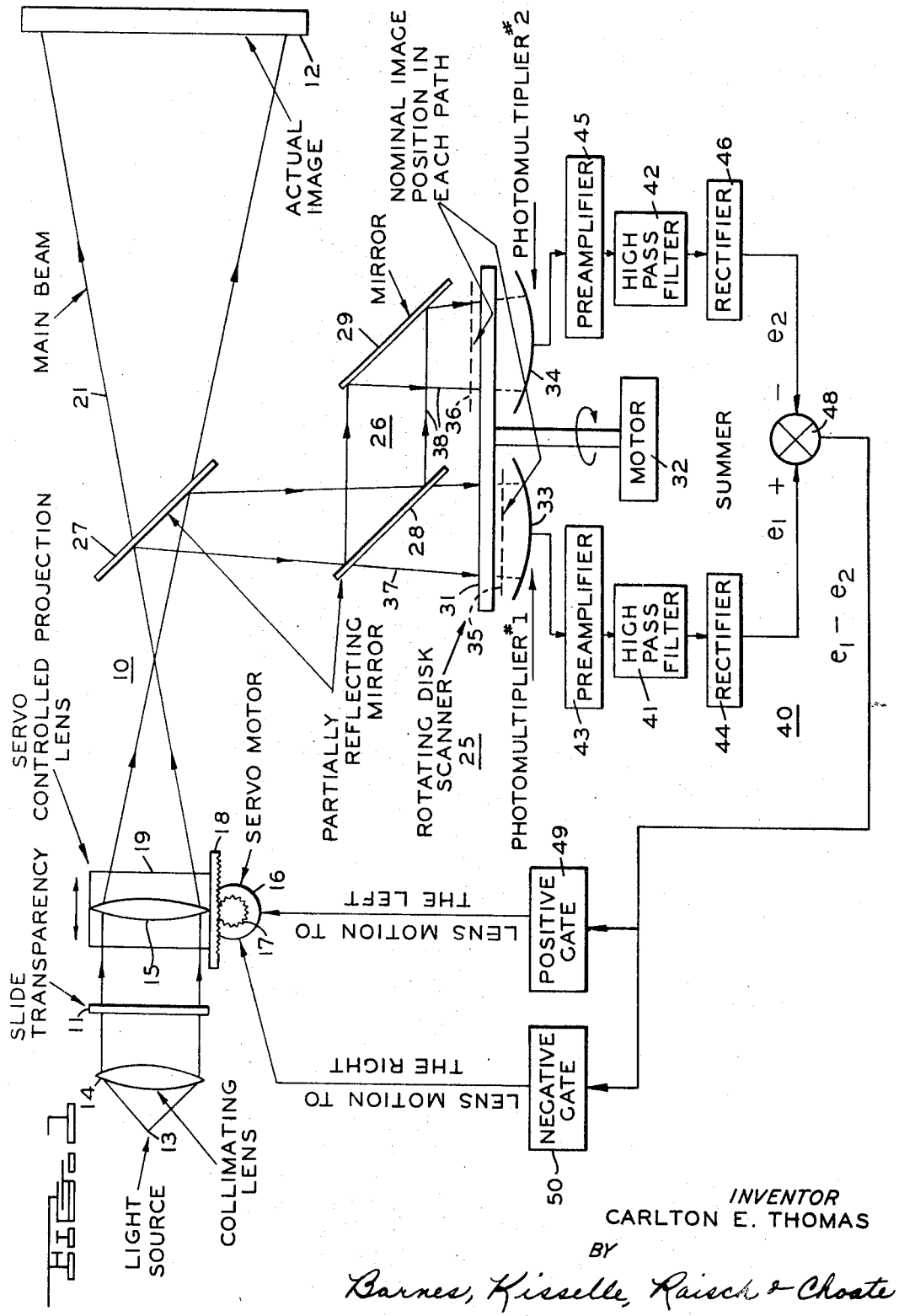

C. E. THOMAS 3,450,883

AUTOMATIC FOCUSING APPARATUS

Filed Feb. 3, 1965

INVENTOR
CARLTON E. THOMAS
BY
Barnes, Kisselle, Raisch & Choate
ATTORNEYS

United States Patent Office 3,450,883
Patented June 17, 1969

3,450,883
AUTOMATIC FOCUSING APPARATUS
Carlton E. Thomas, Ann Arbor, Mich., assignor to Conductron Corporation, Ann Arbor, Mich., a corporation of Delaware
Filed Feb. 3, 1965, Ser. No. 429,993
Int. Cl. G01j 1/36
U.S. Cl. 250—204                          3 Claims

ABSTRACT OF THE DISCLOSURE

An automatic focusing apparatus for an optical system having a movable lens to change the focus which includes a system for selecting two nominal images from the actual image of the main optical axis and positioning these images on the respective sides of a single moving scanner device, the resultant light pattern from the scanner reaching a pair of photomultiplier units which can simultaneously determine not only the magnitude but the direction of the error and energize a correction system to shift the position of the movable lens.

---

This invention relates to automatic focusing apparatus for optical systems, and it may be applied to cameras, projectors, microscopes, telescopes and many other optical instruments. In particular, the invention relates to apparatus for measuring the degree of focus of a real image by comparing the spatial frequency content of two secondary images derived from the real image, and for automatically focusing the real image in response to a control signal supplied by the focus measuring device.

Spatial frequency is related to the rate of change from light to dark in an image. An "in-focus" image has a higher spatial frequency content than an "out-of-focus" image because transitions from light to dark become more gradual the more the image goes out of focus. The spatial frequency content of an image can be measured to provide a sensitive indication of focus.

Automatic focusing apparatus has been proposed for transducing spatial frequencies into an electrical signal which corrects focus by operating a motor to adjust a lens. Known automatic focusing apparatus of this type has been relatively complex and difficult to manufacture economically. Some of the previously proposed automatic focusing apparatus indicated the magnitude of the focus error, but did not indicate the direction of the error; i.e., the direction of the displacement of an image from its "in-focus" position. If both the magnitude and the direction of the error are indicated, the image can be moved to its "in-focus" position automatically by appropriate controls.

Among the objects of this invention are to provide both a focus measuring device, and an automatic focusing apparatus including the measuring device, that are highly reliable, accurate, simple, and manufacturable on an economical basis.

Another object of the invention is to make the automatic focusing apparatus relatively immune to noise.

Another object of the invention is to provide an automatic focusing apparatus which accurately indicates both the magnitude and direction of a focus error.

Yet another object of the invention is to provide a focus measuring device which involves fewer and simpler moving parts than known devices.

In the drawings:

FIG. 1 is a schematic diagram, partly structural and partly in block form, for an automatic focusing apparatus in accordance with the invention.

Figure 3:
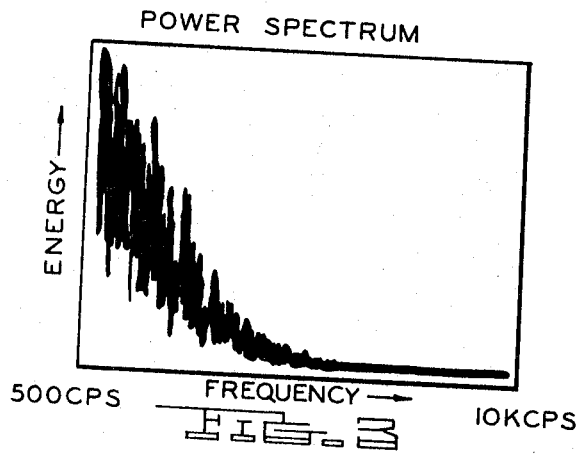
FIG. 3 is a reproduction of a display of the power spectrum of an image for an "in-focus" condition.

In FIG. 1, there is a slide projector 10 for projecting an image of a slide transparency 11 onto a screen 12. The optical system of the protector includes a light source 13, a collimating lens 14 and a movable projection lens 15. The projection lens is driven by a servo motor 16 via a pinion 17 and a rack 18 connected to a mount 19 for the projection lens. With lens 15 in the position shown in FIG. 1, it will be assumed that the image of the main beam 21 falls on the projection screen 12. Motion of lens 15 to the left will move this image to the right, and, conversely, motion of lens 15 to the right will move the image to the left.

The projector 10 is equipped with an automatic focusing apparatus 25 in accordance with one embodiment of the invention. The automatic focusing apparatus is comprised of two main parts: a focus measuring device 26 for measuring the degree of focus of the main image, and a control system 40 for correcting focus by means of signals which control servo motor 16 to move the projection lens 15.

Considering first the focus measuring device, the two beamsplitters 27, 28 and the mirror 29 form an optical system which diverts light from the main beam 21 and forms two auto-focus beams 37, 38. The latter beams are directed on a rotating disk scanner 31. Beamsplitter 27 is a partially reflecting mirror positioned in the path of the main beam 21 and forms the first autofocus beam 37. Part of beam 37 passes through the second beamsplitter 28 and shines on the disk scanner 31. The beamsplitter 28 diverts part of the light of beam 37 to form the other autofocus beam 38. The mirror 29 reflects beam 38 onto disk scanner 31.

Figure 2:
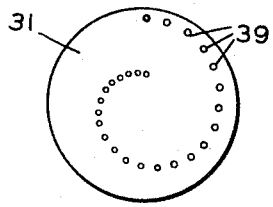
FIG. 2 shows a scanner disk included in the apparatus of FIG. 1.

The face of the disk scanner 31 is shown in FIG. 2. The disk scanner 31 is an opaque plate which has a plurality of pinhole apertures 39 through it arranged in a spiral pattern. The mirrors 27, 28, 29 are positioned such that the image 35 of autofocus beam 37 falls slightly behind (below) the disk 31 and the image 36 of autofocus beam 38 falls slightly ahead of (above) disk 31. With the main image perfectly focused on the projection screen 12, the secondary images 35 and 36 are equidistant from the disk scanner 31 and they are out of focus to the same degree.

A synchronous motor 32 rotates the disk scanner 31, and two photomultipliers 33, 34 collect the portions of autofocus beams 37, 38 which pass through the apertures 39. A suitable photomultiplier is RCA tube 931–A. The photomultipliers 33, 34 transduce the varying intensity patterns of images 35, 36 into time-varying voltages. It may be seen that each aperture scans a narrow strip of secondary image 35 during one portion of a full rotation of the disk. Likewise, each aperture scans a narrow strip of the other secondary image 36 during another portion of a full rotation. Since the apertures 39 are arranged in a spiral, adjacent strips of each image will be scanned successively. It should be noted, however, that it is not essential to scan multiple strips. A single pinhole aperture may be provided in the disk 31 if scanning of only a single strip is desired.

If an image is focused perfectly, it has a maximum high frequency content. If the image is "out-of-focus," the transitions in the image from light to dark become more blurred, and the high spatial frequency content decreases. It is well known that the sharp edges or high contrast delineations in an image have higher spatial frequencies than do blurred or fuzzy edges. In an "out-of-focus" image, the sharp edges are rounded off, and therefore the high spatial frequency content is lower. This reduction in high spatial frequency content has been illustrated in the drawings by means of the displays shown in FIGS. 3 and 4.

Figure 4:
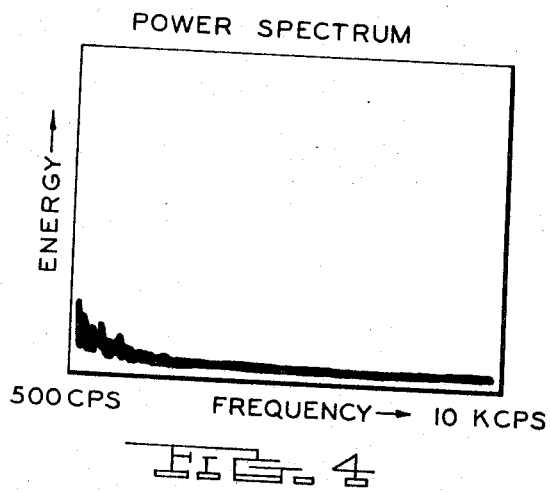
FIG. 4 is a reproduction of a display similar to FIG. 3, but showing the power spectrum for an "out-of-focus" condition.

In FIG. 3, the power spectrum for an "in-focus" image is displayed, and in FIG. 4, the power spectrum for an "out-of-focus" image is displayed. Such displays may be obtained by passing the output signal from one of the photomultipliers 33, 34 through a high bandpass filter to a wave analyzer and displaying the output of the wave analyzer on a cathode ray tube. For the particular power spectra shown in FIGS. 3 and 4, a passband of 500 cycles per second to 10 kilocycles per second was used. A suitable wave analyzer is commercially designated Hewlett Packard Model 302A. It may be seen by comparing FIGS. 3 and 4 that there is less energy over this high frequency passband for the "out-of-focus" image than for the "in-focus" image.

Referring again to FIG. 1, the control system 40 sums the energy in a high frequency passband determined by filters 41, 42. The total energy is proportional to the degree of focus of the image. Specifically, the output signal from photomultiplier 33 passes through a preamplifier 43 and the high pass filter 41 to a rectifier 44 which converts the alternating signal into a direct current voltage $e_1$. Similarly, the output signal from photomultiplier 44 passes through preamplifier 45 and high pass filter 42 and is converted by a rectifier 46 into another direct current voltage $e_2$.

The voltages $e_1$, $e_2$ are focus error signals for images 35 and 36, respectively. Assume that the projection lens 15 moves to the right so that the main image falls in front of the projection screen 12. The secondary image 35 then falls closer to the disk scanner 31, and the other secondary image 36 falls farther from the disk scanner. Consequently, image 35 is more nearly "in-focus" relative to the scanner than image 36. As a result, the energy content of the output signal from photomultiplier 33 exceeds the energy content of the output signal from photomultiplier 34 and $e_1 > e_2$.

The focus error signals $e_1$ and $e_2$ are fed to a summer 48 the output of which is a control signal that is the difference between $e_1$ and $e_2$. The polarity of this control signal determines the direction in which the projection lens 15 is moved by the servo motor 16. The polarities are represented in FIG. 1 by the plus sign adjacent $e_1$ and the minus sign adjacent $e_2$. For the condition just described where $e_1 > e_2$, the control signal is positive, and it actuates a positive gate 49 which energizes the servo motor 16 to move the projection lens 15 to the left, thereby moving the image to the right closer to the projection screen. If the control signal were negative ($e_1 < e_2$), then the negative gate 50 energizes the servo motor to move the lens 15 to the right. Where $e$ equals $e_2$, the image distance from the disk scanner 31 is the same for image 35 as for image 36, and the image of the main beam falls on the projection screen 12.

While the embodiment described above is a projection system which demonstrates the automatic focusing apparatus of the invention, the invention is also applicable to automatic focusing of cameras, microscopes, enlargers, telescopes, and virtually any other optical instrument where a real image exists which must be focused. Furthermore, the apparatus of the invention may be used to focus ultraviolet or infrared optical systems where light detectors sensitive in those regions are employed.

A feature of the apparatus is the separation of a portion of the main beam into two distinct autofocus beams which can be scanned by a simple disk scanner. No elaborate synchronization of moving parts is required. A degree of noise immunity is assured by filtering the error signals so as to pass only a band of high frequencies. Thus, the energy content of the focus error signals must exceed an energy threshold before a control signal is developed. Since there are two autofocus beams, the generation of a control signal which indicates the direction of a focus error, as well as its magnitude, can be accomplished in a straightforward manner.

I claim:

1. Automatic focusing apparatus for an optical system, including in combination, opaque scanning means having at least one scanning aperture therein, optical means for directing light from the field of said system toward said opaque means, said optical means forming a first focusing beam extending in a direction normal to said opaque means with a first image located on one side of said opaque means and a second focusing beam extending in spaced relation to said first focusing beam and also normal to said opaque means with a second image located on the other side of said opaque means, means to cause relative motion between said optical means and said opaque means in a direction perpendicular to the axes of said beams for scanning said first image with said aperture during a first portion of said motion and for scanning said second image with said aperture during a second portion of said same motion such that each beam is scanned simultaneously with said opaque scanning means, first and second photoelectric means cooperating with said opaque means to transduce the portions of said beams which pass through said aperture during rotation of said opaque means into first and second electrical signals, means for comparing said first and second electrical signals to supply a control signal proportional to the degree of focus of said optical system, and means for correcting the focus of said optical system in response to said control signal.

2. Automatic focusing apparatus for an optical system, including in combination opaque scanning means having at least one pinhole aperture therein, optical means for directing light from the main beam of the field of said optical system to said scanning means in first and second parallel, spaced separate beams, means for rotating said scanning means about a center so that in the operation of said appartus said pinhole aperture passes light of said first beam on one side of center during one segment of a full rotation of said scanning means and passes light of said second beam on the other side of center during another segment of a full rotation of said scanning means such that each beam is scanned simultaneously by said scanning means, said optical means imaging said first beam on one side of said opaque means and image said second beam on the other side of said opaque means, photoelectric means for transducing the light of said first beam which passes through said aperture during said operation into a first signal and for transducing the light of said second beam which passes through said aperture during said operation into a second signal, comparison circuit means for comparing said signals to provide a control signal proportional to the degree of focus of said optical system, and means responsive to said control signal for adjusting the focus of said optical system to a condition where said first and second signals are equal.

3. Automatic focusing apparatus for an optical system, including in combination, opaque scanner means comprising a plate having at least one pinhole aperture therein, optical means including a first beamsplitter positioned in the field of said system for diverting light out of said field, a second beamsplitter and a mirror positioned to form first and second parallel beams from the diverted light, each substantially normal to said opaque scanner means, said second beamsplitter, in cooperation with said pinhole aperture, providing a first beam with an image on one side of said opaque means, and said mirror, in cooperation with said pinhole aperture, providing a second beam with an image on the other side of said opaque means, means for moving said opaque scanner means in the plane of the plate to cause said pinhole aperture to scan said first image during one portion of said movement and to cause said pinhole aperture to scan said second image during another portion of said movement such that each beam is scanned simultaneously by said opaque scanning means, first and second photoelectric means cooperating with said opaque means to transduce the portions of said beams which pass through said aperture during motion of said opaque means into first and second electrical signals, first and second high pass filters receiving said first and second electrical signals respectively for selectively passing frequencies within a high frequency band, means for rectifying said first and second electrical signals, means for summing the outputs of said rectifying means to provide a control signal, and servomechanism responsive to said control signal for adjusting the focus of said optical system.

References Cited
UNITED STATES PATENTS 2,831,057    4/1958    Orthuber.
3,274,913    9/1966    Biedermann et al. _____ 95—44

RONALD L. WIBERT, *Primary Examiner.*

V. P. McGRAW, *Assistant Examiner.*

U.S. Cl. X.R.

353—69, 101; 356—122